US012612544B1

(12) United States Patent
George et al.

(10) Patent No.: US 12,612,544 B1
(45) Date of Patent: *Apr. 28, 2026

(54) SURFACTANT AS RELATIVE PERMEABILITY MODIFIER FOR PRODUCED FLUIDS FROM A SUBTERRANEAN FORMATION

(71) Applicant: Halliburton Energy Services, Inc., Houston, TX (US)

(72) Inventors: Shoy George, Pune (IN); Larry Steven Eoff, Houston, TX (US); Jason Adam Denny, Houston, TX (US); Sunita S Kadam, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/931,238

(22) Filed: Oct. 30, 2024

(51) Int. Cl.
*E21B 43/16* (2006.01)
*C09K 8/506* (2006.01)
*E21B 33/138* (2006.01)

(52) U.S. Cl.
CPC ............ *C09K 8/506* (2013.01); *E21B 33/138* (2013.01); *E21B 43/16* (2013.01)

(58) Field of Classification Search
None
See application file for complete search history.

(56) References Cited

U.S. PATENT DOCUMENTS

| 5,962,375 | A | 10/1999 | Sawdon et al. | |
| 2007/0125542 | A1* | 6/2007 | Wei | C09K 8/602 |
| | | | | 507/252 |
| 2009/0118143 | A1* | 5/2009 | Hinkel | E21B 43/32 |
| | | | | 507/200 |
| 2009/0143256 | A1* | 6/2009 | Welton | C09K 8/72 |
| | | | | 507/218 |
| 2009/0143257 | A1* | 6/2009 | Teng | C09K 8/508 |
| | | | | 507/219 |
| 2011/0077175 | A1 | 3/2011 | James et al. | |
| 2012/0279704 | A1* | 11/2012 | Eoff | C09K 8/5751 |
| | | | | 166/280.1 |

(Continued)

FOREIGN PATENT DOCUMENTS

EP            3472261  B1      2/2022

*Primary Examiner* — Andrew Sue-Ako
(74) *Attorney, Agent, or Firm* — Sheri Higgins Law, PLLC; Sheri Higgins

(57) ABSTRACT

A reservoir fluid can be produced from a subterranean formation. The reservoir fluid can include water and hydrocarbons such as oil. It is oftentimes desirable to limit the amount of water that is produced, so a higher ratio of hydrocarbons can be produced. Portions of the subterranean formation can have an initial permeability to water. A relative permeability modifier can be used in these portions to restrict or prevent water from being produced. The relative permeability modifier can increase the hydrophobicity of the portion that allows the hydrocarbons to flow through while substantially limiting the amount of water. The relative permeability modifier can be a surfactant. The surfactant can be an acid or a salt of the acid. The relative permeability modifier can coat the surfaces of substances in the formation whereby the permeability to an aqueous fluid is reduced from the initial permeability.

17 Claims, 4 Drawing Sheets

Hydrophilic head     Hydrophobic tail

Pre-coated
Surface

Hydrophobically modified
Surface

(56)            References Cited

U.S. PATENT DOCUMENTS

| | | | |
|---|---|---|---|
| 2013/0196885 A1* | 8/2013 | Pabalan | C09K 8/86 |
| | | | 507/239 |
| 2013/0306314 A1* | 11/2013 | Curtice | C09K 8/035 |
| | | | 166/279 |
| 2014/0367111 A1* | 12/2014 | Gamage | C09K 8/12 |
| | | | 507/225 |
| 2015/0145512 A1 | 5/2015 | Chen et al. | |
| 2018/0010432 A1* | 1/2018 | Oehler | E21B 43/08 |
| 2018/0305603 A1* | 10/2018 | Shumway | C09K 8/84 |
| 2018/0320049 A1 | 11/2018 | Shumway et al. | |

* cited by examiner

SURFACTANT AS RELATIVE PERMEABILITY MODIFIER FOR PRODUCED FLUIDS FROM A SUBTERRANEAN FORMATION

TECHNICAL FIELD

Relative permeability modifiers can be used to limit the amount of water produced from a subterranean formation while allowing production of a hydrocarbon liquid. The relative permeability modifier can be used in carbonate/ sandstone-bearing areas of the formation having high permeabilities.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Figure 1:
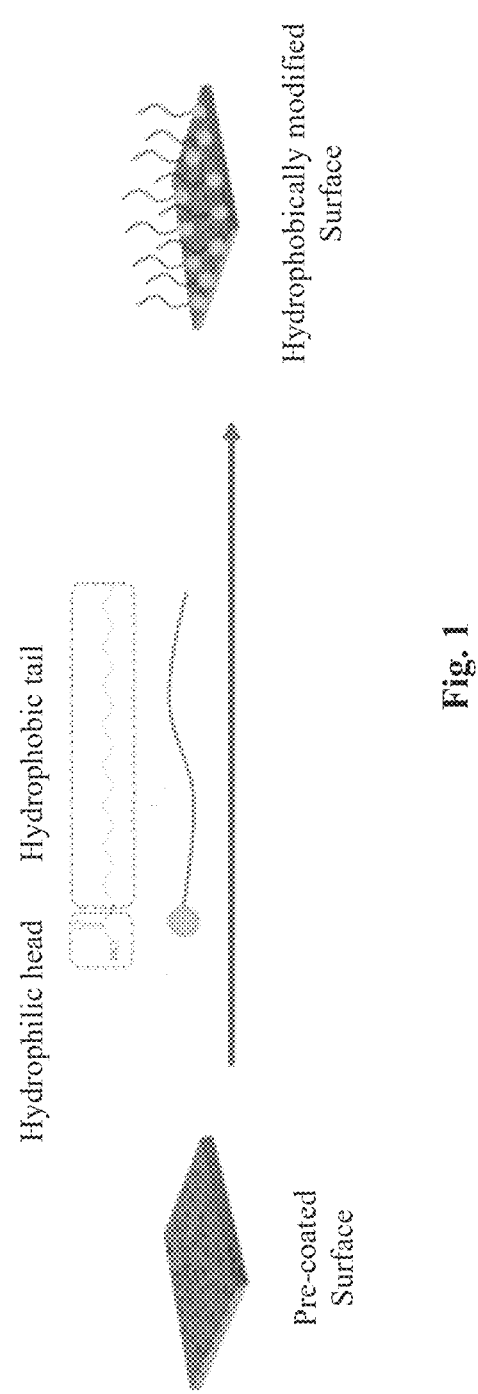
FIG. 1 is a schematic showing a theorized mechanism whereby a calcium carbonate surface is coated with a relative permeability modifier.

Oil and gas hydrocarbons are naturally occurring in some subterranean formations. In the oil and gas industry, a subterranean formation containing oil and/or gas is referred to as a reservoir. A reservoir can be located under land or offshore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a subterranean formation" means and includes into any portion of the well, including into the wellbore, into the near-wellbore region via the wellbore, or into the subterranean formation via the wellbore.

Hydrocarbons, for example oil and gas, can be produced from a subterranean formation. The subterranean formation can have different zones or regions that can also contain water in addition to the hydrocarbons. Oftentimes it is desirable to prevent or limit the amount of water that is produced along with hydrocarbons. If water is produced with hydrocarbons, then the water must be separated from the hydrocarbons and either disposed of, cleaned up, or injected back into another formation via an injection well. As production continues over time, the ratio of produced water to produced hydrocarbons can increase to the point that it presents a significant economic loss.

Relative permeability modifiers can be used to prevent or limit the amount of water that is produced. The relative permeability modifiers can adsorb onto the surfaces of substances, such as rocks including sandstone and minerals, making up the formation thereby rendering the surfaces hydrophobic. Hydrophobic materials repel water; whereas hydrophilic materials are attracted to water. Thus, substances of a formation that are hydrophilic will typically allow water to flow through the formation and into a wellbore; and substances that are hydrophobic will typically repel water, thus hindering its ability to flow through the formation. However, the relative permeability modifier's effectiveness depends on the type of substances of a subterranean formation as well as the permeability of the formation. By way of example, some polymers have been used effectively in sandstone-bearing formations and/or carbonate-bearing formations. However, these polymers may not be effective when the permeability of the formation is high (e.g., above 6 darcy "D"). As the permeability of the formation increases, the size of the pore throats also increases. As such, these polymers might not have the desired effectiveness possibly because the molecular weight of the polymers is not enough to decrease fluid flow through the larger pores. Thus, there is a need for relative permeability modifiers that can be used in high permeability formations.

A method of treating a portion of a subterranean formation can include introducing a fluid into the portion of the subterranean formation that has an permeability to an aqueous fluid, wherein the fluid comprises: a liquid; and a relative permeability modifier, wherein the relative permeability modifier is a surfactant, and causing or allowing the relative permeability modifier to coat surfaces of the portion of the subterranean formation, wherein after coating, a final permeability to the aqueous fluid is reduced.

The various disclosed embodiments can apply to all of the methods. As used herein, any reference to the unit "gallons" means U.S. gallons.

The portion of the subterranean formation can be part of a sandstone-bearing formation, a carbonate-bearing formation, or can include other types of substances. The portion of the subterranean formation can also include a variety of layers or strata that are composed of different substances. The subterranean formation can include one or more water-producing zones, oil-producing zones, or hydrocarbon gas producing zones. The various zones can make up the portion of the subterranean formation or be located adjacent to the portion of the subterranean formation. The subterranean formation can contain a reservoir fluid to be produced from the portion of the subterranean formation, called a production zone. The reservoir fluid can include aqueous fluids, such as freshwater or brine, or and hydrocarbons, such as liquid or gaseous hydrocarbons. The methods can further include producing the reservoir fluid from the subterranean formation. The reservoir fluid can flow through the portion of the subterranean formation and into a wellbore to a wellhead. It is to be understood that while the production zone may not include water producing zones, adjacent portions of the subterranean formation may include water producing zones whereby the aqueous fluid can be pulled from the adjacent portions and into the production zone. The fluid can also be introduced into more than one portion of the subterranean formation, for example, adjacent zones.

The portion of the subterranean formation (i.e., the production zone) can have varying initial permeabilities to an aqueous fluid. The portion of the subterranean formation can have, for example, an initial permeability to an aqueous fluid of greater than 6 Darcy (D). The portion of the subterranean formation can also have an initial permeability greater than 10 D, greater than 15 D, or greater than 20 D. The aqueous fluid includes water and optionally a water-soluble salt. Permeability in this aspect is defined as the ability of fluids to flow through rock or other porous media. Permeability is calculated according to Darcy's law as shown in Equation 1 below.

$$Q = \frac{Ak\Delta P}{\mu \Delta x} \qquad \text{Eq. 1}$$

where Q is the volumetric fluid flow rate through the medium;
A is the area of the medium;
k is the permeability of the medium;
$\Delta P$ is the applied pressure differential;
$\mu$ is the dynamic viscosity of the fluid; and
$\Delta x$ is the thickness of the medium.

By way of example, a medium with a permeability of 1 Darcy permits a flow of 1 cm³/s of a fluid with viscosity 1 centipoise (cP) (1 millipascal second "mPa·s") under a pressure gradient of 1 atm/cm acting across an area of 1 cm². The fluid that is introduced into the portion of the subterranean formation includes a liquid. The liquid can comprise water. The water can be selected from the group consisting of freshwater, seawater, brine, and any combination thereof in any proportion. The liquid can further include a water-soluble salt. The salt can be selected from the group consisting of sodium chloride, sodium bromide, calcium chloride, calcium bromide, potassium chloride, potassium bromide, magnesium chloride, sodium formate, potassium formate, cesium formate, sodium sulfate, and any combination thereof.

The fluid can be a drilling fluid, spacer fluid, workover fluid, or enhanced recovery fluid. The fluid can be introduced into the subterranean formation to perform the function of the fluid. For example, a drilling fluid can be introduced for the purposes of drilling a wellbore into the subterranean formation. The fluid can also include other additives that are soluble or insoluble in the liquid, such as but not excluding scale inhibitors, clay stabilizers, corrosion inhibitors, organic solvents, mutual solvents, and any combination thereof.

The fluid also includes the relative permeability modifier. According to any of the embodiments, the relative permeability modifier is not a polymer. According to any of the embodiments, the fluid may be substantially free from a second or additional relative permeability modifier, such as a polymer. The relative permeability modifier is a surfactant. A surfactant is an amphiphilic molecule comprising a hydrophobic tail group and a hydrophilic head group. The hydrophilic head can be charged. A cationic surfactant includes a positively charged head. An anionic surfactant includes a negatively charged head. A zwitterionic surfactant includes both a positively- and negatively charged head. A surfactant with no charge is called a non-ionic surfactant. A surfactant with a charged head can be used. By way of example, an anionic surfactant may be useful in carbonate-bearing formations, while a cationic surfactant may be useful in sandstone-bearing formations.

The surfactant can be a fatty acid, derivative of a fatty acid, or a salt thereof. The surfactant can have a head group selected from carboxylates, sulfonates, sulfates, or phosphonates. The head group can also be an acid (e.g., lauric acid) derived from an oil, such as coconut oil, or a derivative of an acid. The surfactant also includes a tail having a carbon chain length. The carbon chain length of the tail can range from $C_{10}$ to $C_{30}$. The surfactant can be selected from stearic acid or lauric acid. The surfactant can also be a salt of the acid or a derivative of the acid. By way of a non-limiting example, the surfactant can be a sodium, potassium, cesium, or ammonium salt of stearic acid.

The relative permeability modifier can be soluble in the liquid of the fluid. The liquid can be water. The liquid can also include a water-soluble salt. According to any of the embodiments, the relative permeability modifier is water soluble. A salt of the acid may be used to be water soluble. As used herein, "soluble" means at least about 0.1 weight percent of the relative permeability modifier is soluble in the solvent at a temperature of 74° F. (23.3° C.) and a pressure of 1 atmosphere. According to any of the other embodiments, the relative permeability modifier is water insoluble, and the fluid further comprises a mutual solvent for the relative permeability modifier. Examples of mutual solvents include but are not limited to Musol, isopropyl alcohol, or ethylene glycol. The mutual solvent can be included in the fluid in a concentration of 1 to 99% by volume of the liquid. The mutual solvent can be selected based on the type of acid or the specific salt of the acid that is used as the relative permeability modifier such that the surfactant is soluble in the mutual solvent or in combination with water. The hydrophilic head group as well as the carbon chain length of the tail can be selected such that the surfactant is soluble in water, the mutual solvent, or a combination of the water and mutual solvent. Additionally, a salt of the acid can be used to increase the solubility of the surfactant. By ensuring that the relative permeability modifier is soluble in the fluid allows the fluid to be pumpable and allows the relative permeability modifier to easily coat the surfaces of the portion of the subterranean formation.

The relative permeability modifier can be included in the fluid at a concentration in a range of 0.01% to 50% by weight of the liquid, 0.1% to 10%, or 0.25% to 3% by weight of the liquid. The concentration of the relative permeability modifier can be selected based on the anticipated bottomhole temperature of the portion of the subterranean formation. The bottomhole temperature of the portion of the subterranean formation can be in a range, for example, of 50° F. to 400° F. (10° C. to 204.4° C.).

The methods include causing or allowing the relative permeability modifier to coat surfaces of the portion of the subterranean formation, wherein after coating, the final permeability to the aqueous fluid is reduced from the initial permeability. The reduction can be any percentage that reduces production of aqueous fluids. The final permeability to the aqueous fluid can be, for example, a reduction by at least 40%, 60%, or 80% from the initial permeability. By way of example, if the initial permeability to the aqueous fluid is 6 D, then the final permeability to the aqueous fluid can be less than or equal to 1.2 D. According to any of the embodiments, the final permeability to the aqueous fluid is reduced by at least 85%, at least 90%, or at least 95% from
the initial permeability. The portion of the subterranean
formation can have a final permeability to the aqueous fluid
of less than 10 D, less than 5 D, or less than 2 D after
coating. The concentration of the relative permeability
modifier can be selected such that the permeability to the
aqueous fluid reaches the desired percent reduction. A higher
percent reduction, for example at least 95%, means that a
lower volume of water is produced along with the hydro-
carbons compared to a lower percent reduction, for example
80%. The concentration of the relative permeability modifier
can also be selected, based in part, on the bottomhole
temperature of the portion of the subterranean formation in
order to achieve the desired reduction in permeability to the
aqueous fluid. By way of example, if the bottomhole tem-
perature of the portion of the subterranean formation is
anticipated to be 200° F. (93.3° C.), then the concentration
of the relative permeability modifier can be increased from
2 to 3 wt. %.

FIG. 1 represents a theorized mechanism whereby a
surfactant, such as stearic acid, coats the surfaces of the
portion of the subterranean formation. Without being bound
by theory, it is believed that surfaces of the portion of the
subterranean formation, for example calcium carbonate
(CaCO₃) surfaces, can be water wet. This enables the
hydrophilic head groups of the surfactant to adsorb onto the
surfaces. After adsorption, the hydrophobic tails can extend
away from the surfaces, which changes the hydrophobicity
of the surfaces. The head group of the surfactant can be
selected such that the hydrophilic head group adsorbs onto
the surfaces. The selection can be based on a variety of
factors, including but not limited to, the type of rocks or
other substances that are or are likely to be present in the
portion of the subterranean formation to be treated. By way
of example, if the portion of the subterranean formation
predominantly includes calcium carbonate substances, then
the surfactant can be stearic acid or a salt of stearic acid. This
change in hydrophobicity can restrict or prevent aqueous
liquids to be produced from the formation along with
hydrocarbons.

The amount of hydrophobicity that the surfaces possess as
a result of being coated with the relative permeability
modifier is directly related to the percentage reduction in the
permeability to the aqueous fluid. This in turn is directly
related to the volume of water that is produced from the
subterranean formation. It is to be understood that "water"
as used in the context of produced formation fluids includes
any aqueous-based liquid, such as freshwater, brine, or
brackish water. For example, a higher amount of hydropho-
bicity can increase the percent reduction of the permeability
and thus decrease the volume of water that is produced. The
type of surfactant selected, the specific hydrophilic head
group, the carbon chain length of the tail, and the concen-
tration of the surfactant can be adjusted and/or selected to
provide the desired percentage reduction in the permeability
of the portion of the subterranean formation to the aqueous
fluid.

The fluid can have desirable properties that allow the fluid
to be pumped into the portion of the subterranean formation
wherein the relative permeability modifier easily coats the
surfaces of the portion of the subterranean formation. As
discussed above, polymers or other relative permeability
modifiers may not cause the final permeability to the aque-
ous fluid to be reduced by the desired percentage (e.g., at
least 40%, 80%, 90%, or 95%) when the initial permeability
is greater than 6 D. The surfactant as the relative perme-
ability modifier can penetrate a desired depth into the portion of the subterranean formation, coat more of the
surfaces, increase the hydrophobicity of the surfaces of the
formation, and provide the desired permeability reduction in
formations having an initial permeability greater than 6 D.
The relative permeability modifier also advantageously
works immediately after coating the surfaces of the portion
of the subterranean formation. Accordingly, the contact time
of the fluid with the surfaces does not need to be several
minutes to hours in order for the relative permeability
modifier to increase the hydrophobicity and provide the
desired permeability reduction.

EXAMPLES

Figure 2:
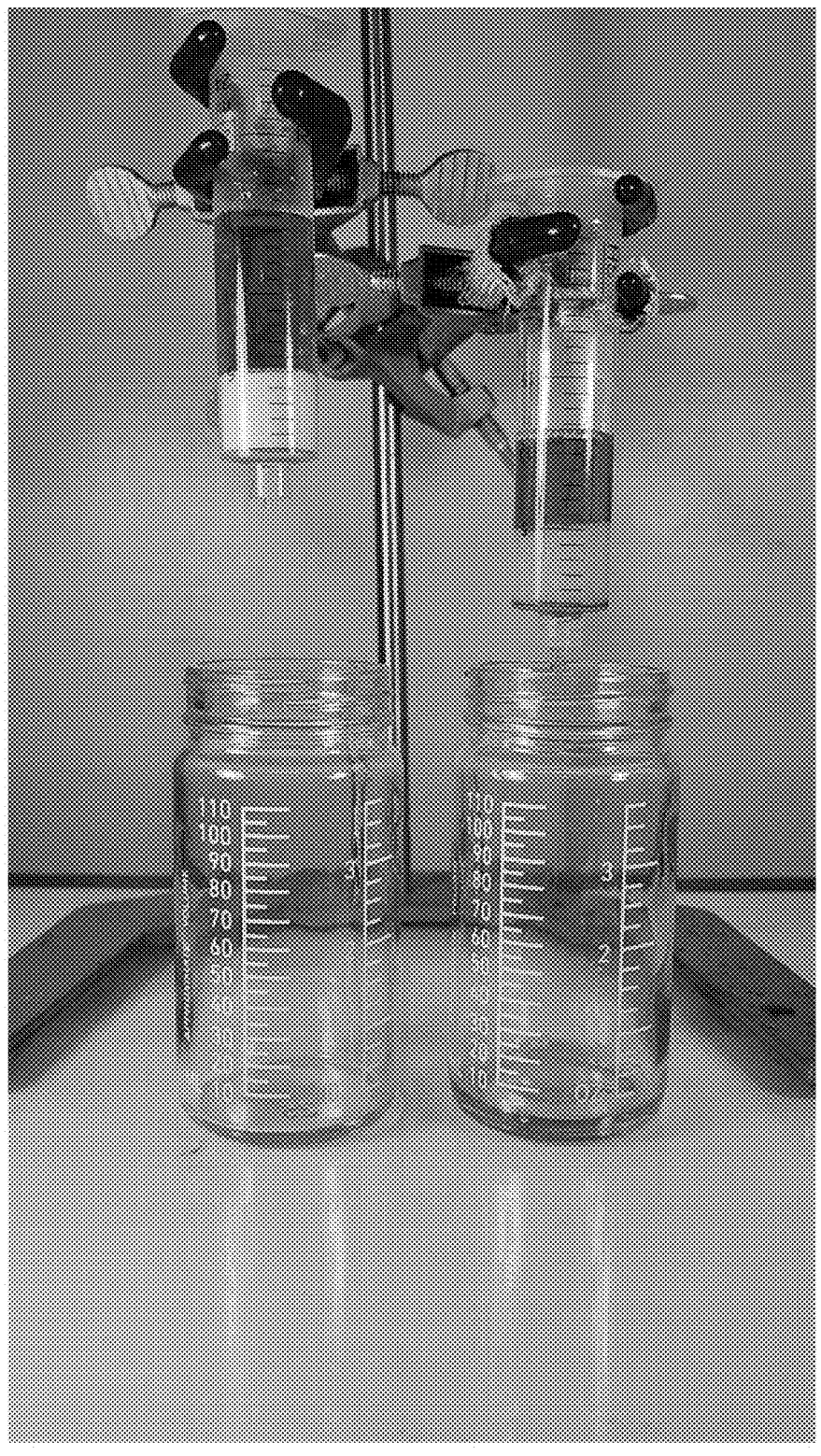
FIG. 2 is a photograph of two syringes showing water and an oil being poured on top of a syringe pack that has been coated with a relative permeability modifier.
Figure 3:
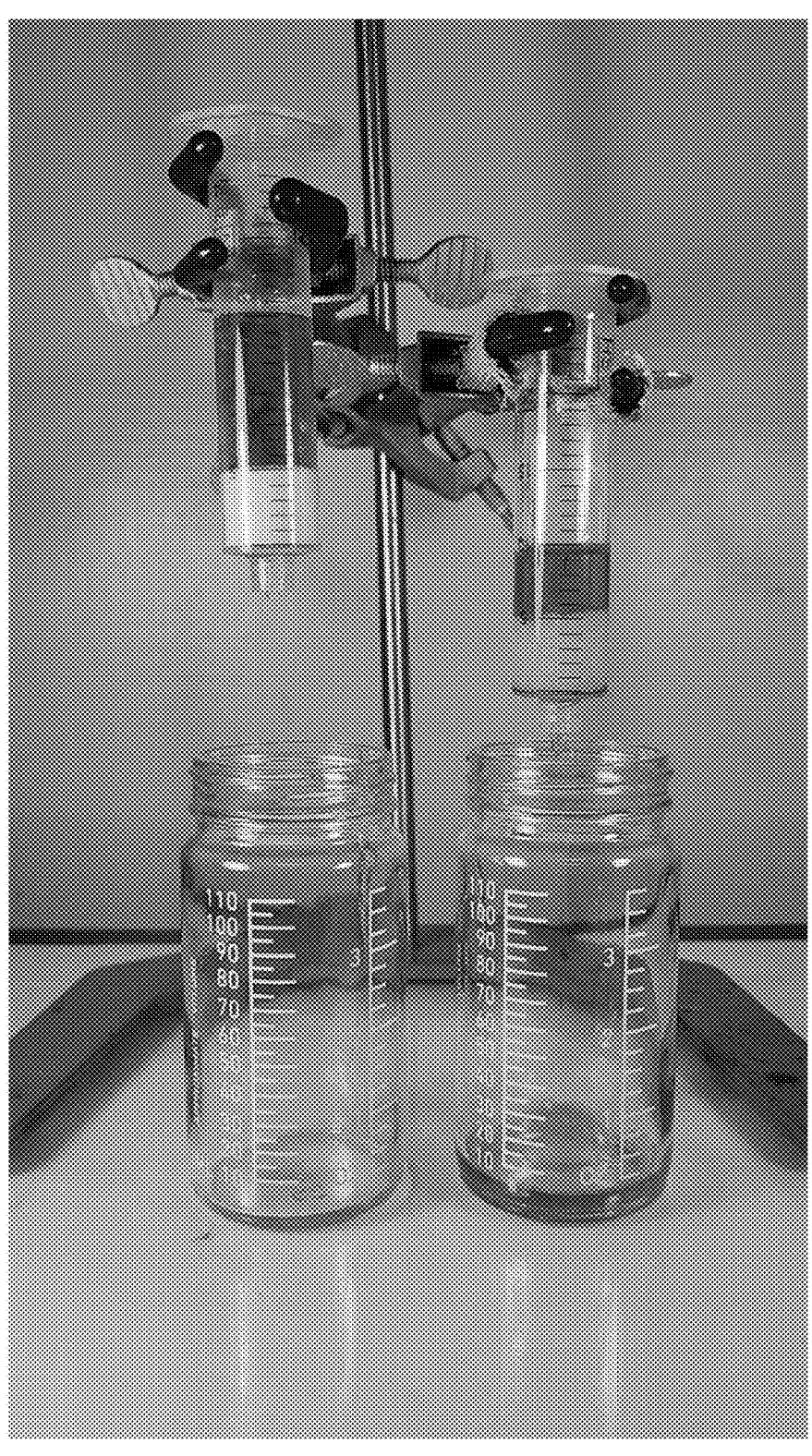
FIG. 3 is a photograph of syringes showing the oil flowing through the pack and water not flowing through the pack.
Figure 4:
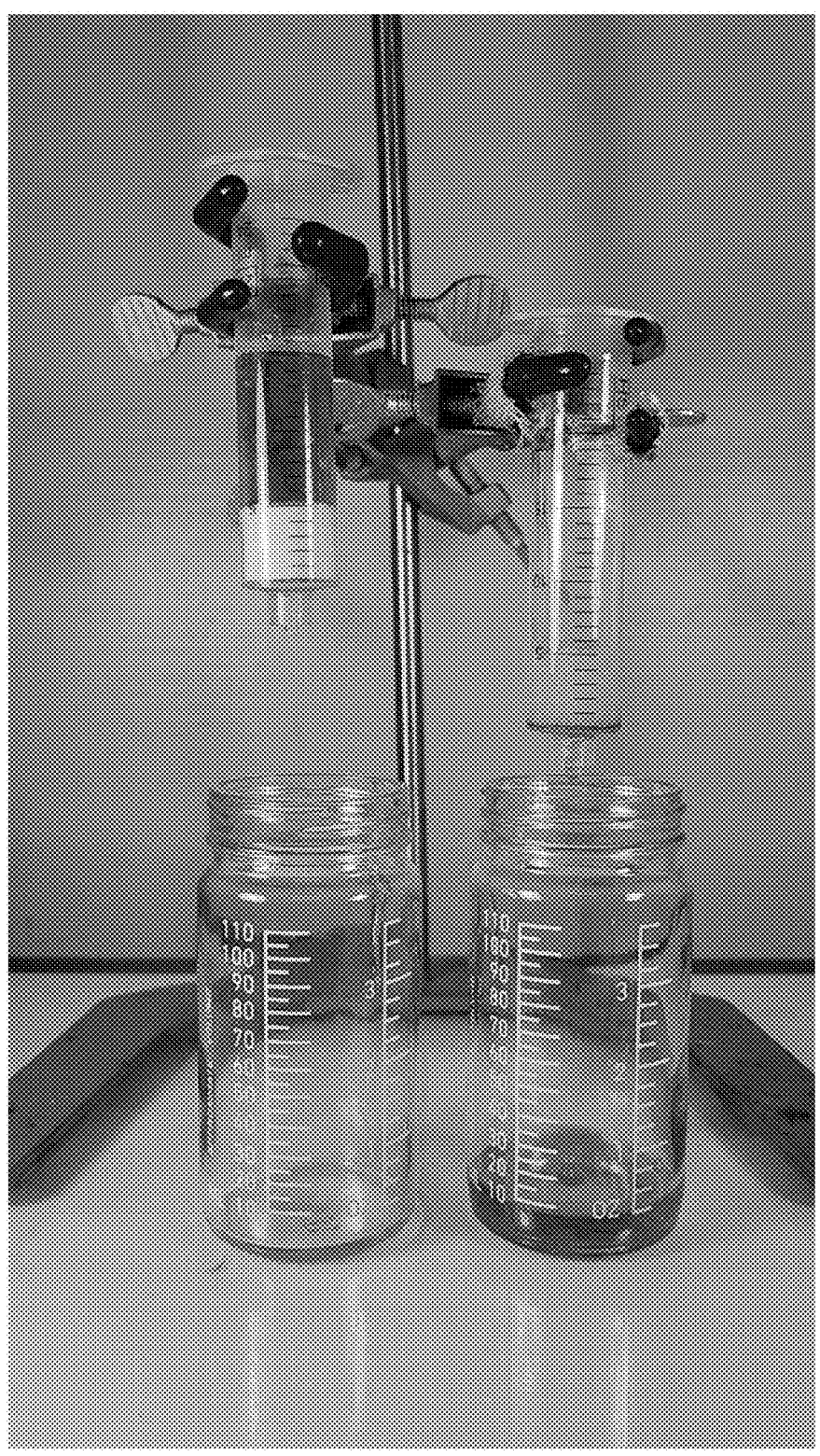
FIG. 4 is a photograph of the syringes showing all of the oil has completely flowed through the pack, but the water has remained on top with no flow through the pack.

Syringe tests and core flow tests were performed to
evaluate the effectiveness of the relative permeability modi-
fier. For the results shown in FIGS. 2-4, two separate
25-milliliter syringes were packed with calcium carbonate
coated with a sodium salt of stearic acid at 2 weight percent
(wt. %) up to approximately the 5-mL line to simulate
calcium carbonate bearing areas of a subterranean forma-
tion. A volume of deionized water was dyed blue, and diesel
was separately dyed red. The dyed water and diesel were
added to the top of the syringes above the coated pack as
represented in FIG. 2. The liquids (i.e., water or diesel) were
allowed to gravity feed through the syringes. As can be seen
in FIG. 3, at 8 seconds, the water was not flowing through
the coated pack, whereas the diesel was flowing through the
coated pack. In FIG. 4 at 45 seconds, all of the diesel had
completely flowed through the coated pack, whereas the
water still remained above its coated pack and did not flow
into the pack at all. This indicates that the water column was
completely blocked by the coated pack and the water
remained on top for several hours. This also indicates that
the coated pack allowed 100% of the oil to pass through,
which is indicative of the increased hydrophobicity of the
calcium carbonate coated with the relative permeability
modifier.

Core flow tests were performed to determine the percent-
age decrease in permeability to an aqueous fluid and/or oil.
A 3.5 wt. % relative permeability modifier solution was
prepared by treating stearic acid with sodium hydroxide
(NaOH) to convert it to a sodium salt of stearic acid. The
RPM was added to water and approximately 35 vol. % of
Musol (a mutual solvent) was added to improve the solu-
bility of the RPM. Cores of calcium carbonate of approxi-
mately 6 centimeters in length were then prepared by
packing a cell with calcium carbonate particles with a
targeted initial permeability in a range of 10 to 20 D. Test
numbers 1 and 2 were performed at a temperature of 75° F.
(23.9° C.), and test number 3 was performed at a tempera-
ture of 190° F. (87.8° C.). An aqueous solution of water and
2% potassium chloride salt by weight was prepared. The
aqueous solution was flowed through the cores, and the
initial permeability of the cores to the aqueous solution was
determined using Darcy's law in Eq. 1 above. The actual
initial permeability had some variation across the 3 cores
due to variations inherent in the packing of the cells. The
cores were then treated with the relative permeability modi-
fier solution. The salt solution was flowed again through the
pre-coated core and the final permeability to the aqueous
solution was determined using Darcy's law. The percent
reduction in permeability to the aqueous solution was cal-
culated as % reduction=((initial−final)/initial)*100. Table 1
shows the results of three different tests.

7

TABLE 1

| | | | |
|---|---|---|---|
| | Core flow test results | | |
| Test No | Initial permeability | Final permeability | % reduction |
| Test 1 | 16 D | 0.18 D | 99% |
| Test 2 | 19 D | 0.90 D | 95% |
| Test 3 | 23 D | 1.45 D | 94% |

As can be seen in Table 1, the permeability to the aqueous fluid in all 3 cores was reduced by at least 94%. This indicates that the relative permeability modifier is extremely effective in reducing water flow when the initial permeability was above 15 D.

Table 2 shows the results of testing that was used to evaluate the sustainability of the coating on the calcium carbonate particles, in part, to determine whether the coating would degrade or become ineffective in a subterranean formation over time. The pore volume (PV) was calculated and is the volume of liquid required to completely fill the core pack. The core was coated with 2 wt. % of the relative permeability modifier solution as described in reference to Table 1 and tested at a temperature of 180° F. (82.2° C.). The volume of salt solution (2% KCl in water) that was flowed through the core pack was equal to 1,500-pore volume. That is, the total volume of salt solution was equal to the core volume times 1,500. The 1,500-pore volume was roughly equal to a continuous flow through the core pack for 24 hours. The final permeability was then calculated when the 1,500-pore volume had been reached. As can be seen, even after constant flow of 1,500-pore volume, the final permeability was 0.18 D with a percent reduction of 98%. This indicates that the relative permeability modifier not only provides superior performance in reducing water flow through the core pack, but also works very effectively for long periods of time. This advantageously means that the portion of the subterranean formation may only need to be coated one time or only a couple of times to reduce or prevent production of water during the production operation.

TABLE 2

| | | | | |
|---|---|---|---|---|
| | Core flow test results | | | |
| Test No | Initial permeability | Final permeability | % reduction | PV pumped |
| Test 1 | 11.75 D | 0.18 D | 98 % | 1,500 |

The core flow tests with the results shown in Table 3 were conducted to evaluate the effect of the concentration of the relative permeability modifier (RPM) at different temperatures. The cores, RPM solution preparation, aqueous fluid, and testing procedures were the same as those described with reference to Table 1. As can be seen in Table 3, the percent reduction in permeability to the aqueous fluid was a minimum of 85%. As can also be seen, by increasing the concentration of the relative permeability modifier from 0.25 wt. % to 1 wt. % at a temperature of 180° F. (82.2° C.), resulted in a percent reduction increase from 85% to 97%, while a concentration increase from 1 wt. % to 2 wt. % netted an additional 2% reduction (from 97% to 99%). This indicates that the concentration of the relative permeability modifier can be adjusted based on the anticipated bottomhole temperature of the portion of the subterranean formation to provide the desired percent decrease in permeability to the aqueous fluid. Moreover, as can be seen, concentrations of the relative permeability modifier at 2 wt. % and 3 wt. % worked very effectively to reduce water flow even at a higher temperature of 205° F. (96.1° C.). This indicates that the relative permeability modifier is very effective in a wide range of formation temperatures.

TABLE 3

| | | | | |
|---|---|---|---|---|
| | | Core flow test results | | |
| RPM concentration | Initial permeability | Final permeability | % reduction | Temperature |
| 0.25 wt. % | 15.5 D | 2.325 D | 85% | 180° F. (82.2° C.) |
| 1 wt. % | 15.4 D | 0.462 D | 97% | 180° F. (82.2° C.) |
| 2 wt. % | 11.8 D | 0.118 D | 99% | 180° F. (82.2° C.) |
| 2 wt. % | 15.7 D | 1.884 D | 88% | 205° F. (96.1° C.) |
| 3 wt. % | 13.4 D | 0.938 D | 93% | 205° F. (96.1° C.) |

A test fluid consisting of the liquid, an optional solvent, and the surfactant as the relative permeability modifier and in the same proportions as the fluid can have core flow test reduction in the permeability to an aqueous fluid greater than or equal to a desired percentage; compared to a control test fluid consisting of the liquid, the optional solvent, excluding the surfactant or including a polymer RPM instead, having a core flow test reduction in the permeability to an aqueous fluid of less than the desired percentage. It is to be understood that while the fluid can contain other ingredients, it is the surfactant as the relative permeability modifier that is primarily or wholly responsible for the stated percent reduction in the permeability to an aqueous fluid. Therefore, it is not necessary for the fluid to include additional relative permeability modifiers to achieve the stated percent reduction. It is also to be understood that any discussion related to a "test fluid" or "control test fluid" for the core flow tests is included for purposes of demonstrating that while the fluid being introduced into the portion of the subterranean formation may contain other ingredients, it is the surfactant as the relative permeability modifier that provides the stated percent reduction. Therefore, while it may not be possible to perform a core flow test in a formation for the specific fluid being introduced, one can formulate a test fluid to be core flow tested in a laboratory to identify if the specific surfactant and concentration of the surfactant will provide the stated percent reduction. While it is also possible for an operator at the wellhead to determine the effectiveness of the fluid in reducing the permeability of the formation to an aqueous fluid by monitoring the volume of water produced along with hydrocarbons, one can still perform core flow testing in a laboratory to select the specific surfactant to be used, the specific hydrophilic head, carbon chain length of the tail, and concentration based on the specific substances in the portion of the subterranean formation and anticipated bottomhole temperature.

An embodiment of the present disclosure is a method of treating a portion of a subterranean formation comprising: introducing a fluid into the portion of the subterranean formation that has an initial permeability to an aqueous fluid, wherein the fluid comprises: a liquid; and a relative permeability modifier, wherein the relative permeability modifier is a surfactant, and wherein the surfactant is a fatty acid, a derivative of a fatty acid, or a salt thereof, and causing or allowing the relative permeability modifier to coat surfaces of the portion of the subterranean formation, wherein after coating, a final permeability to the aqueous fluid is reduced from the initial permeability. Optionally, the portion of the subterranean formation is part of a sandstone-bearing formation, carbonate-bearing formation, or combinations thereof. Optionally, the subterranean formation contains a reservoir fluid, and wherein the reservoir fluid comprises an aqueous liquid and hydrocarbons in liquid, gas, or both liquid and gas forms. Optionally, the method further comprises producing the reservoir fluid from the subterranean formation. Optionally, the initial permeability to the aqueous fluid is greater than 6 Darcy. Optionally, the initial permeability to the aqueous fluid is greater than 15 Darcy. Optionally, the final permeability to the aqueous fluid is less than 5 Darcy. Optionally, the liquid comprises water, and wherein the water is selected from the group consisting of freshwater, seawater, brine, and any combination thereof in any proportion. Optionally, the relative permeability modifier is water insoluble, wherein the fluid further comprises a mutual solvent, and wherein the relative permeability modifier is soluble in the mutual solvent. Optionally, the relative permeability modifier is water soluble. Optionally, the surfactant is a salt of the fatty acid or salt of the derivative of the fatty acid. Optionally, the relative permeability modifier is an anionic or cationic surfactant. Optionally, the surfactant comprises a head group selected from carboxylates, sulfonates, sulfates, or phosphonates. Optionally, the surfactant comprises a tail having a carbon chain length. Optionally, the carbon chain length is in a range from $C_{10}$ to $C_{30}$. Optionally, the fatty acid is selected from stearic acid, lauric acid, or palmitic acid. Optionally, the relative permeability modifier is in a concentration in a range of 0.01% to 50% by weight of the liquid. Optionally, the final permeability to the aqueous fluid is reduced by at least 40% from the initial permeability. Optionally, the permeability to the aqueous fluid is reduced by at least 80% from the initial permeability. Optionally, the relative permeability modifier increases the hydrophobicity of the coated surfaces of the portion of the subterranean formation.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole, such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the various embodiments are well adapted to attain the ends and advantages mentioned as well as those that are inherent therein. The particular embodiments disclosed above are illustrative only, as the various embodiments may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more fluids, etc., as the case may be, and does not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent(s) or other documents that may be incorporated herein by reference, the definitions that are consistent with this specification should be adopted.

What is claimed is:

1. A method of treating a portion of a subterranean formation comprising:
  introducing a fluid into the portion of the subterranean formation that has an initial permeability to an aqueous fluid, wherein the fluid comprises:
    a liquid, wherein the liquid comprises water;
    a mutual solvent; and
    a relative permeability modifier, wherein the relative permeability modifier is a surfactant, wherein the surfactant is a fatty acid or a salt thereof, wherein the relative permeability modifier is water insoluble, and wherein the relative permeability modifier is soluble in the mutual solvent, and
  causing or allowing the relative permeability modifier to coat surfaces of the portion of the subterranean formation, wherein after coating, a final permeability to the aqueous fluid is reduced by at least 40% from the initial permeability resulting in a lower volume percent of an aqueous fluid produced along with hydrocarbons from the subterranean formation.

2. The method according to claim 1, wherein the portion of the subterranean formation is part of a sandstone-bearing formation, carbonate-bearing formation, or combinations thereof.

3. The method according to claim 1, wherein the subterranean formation contains a reservoir fluid, and wherein the reservoir fluid comprises the aqueous liquid and the hydrocarbons in liquid, gas, or both liquid and gas forms.

4. The method according to claim 3, further comprising producing the reservoir fluid from the subterranean formation.

5. The method according to claim 1, wherein the initial permeability to the aqueous fluid is greater than 6 Darcy.

6. The method according to claim 1, wherein the initial permeability to the aqueous fluid is greater than 15 Darcy.

7. The method according to claim 1, wherein the final permeability to the aqueous fluid is less than 5 Darcy.

8. The method according to claim 1, wherein the water is selected from the group consisting of freshwater, seawater, brine, and any combination thereof in any proportion.

9. The method according to claim 1, wherein the relative permeability modifier is an anionic or cationic surfactant.

10. The method according to claim 1, wherein the surfactant comprises a head group comprising carboxylates.

11. The method according to claim 1, wherein the surfactant comprises a tail having a carbon chain length.

12. The method according to claim 11, wherein the carbon chain length is in a range from $C_{10}$ to $C_{30}$.

13. The method according to claim 1, wherein the fatty acid is selected from stearic acid, lauric acid, or palmitic acid.

14. The method according to claim 1, wherein the relative permeability modifier is in a concentration in a range of 0.01% to 50% by weight of the liquid.

15. The method according to claim 1, wherein the final permeability to the aqueous fluid is reduced by at least 80% from the initial permeability.

16. The method according to claim 1, wherein the relative permeability modifier increases the hydrophobicity of the coated surfaces of the portion of the subterranean formation.

17. The method according to claim 1, wherein the fluid is a drilling fluid, spacer fluid, workover fluid, or enhanced recovery fluid.

* * * * *